United States Patent
Kim et al.

(10) Patent No.: US 9,258,841 B2
(45) Date of Patent: Feb. 9, 2016

(54) METHOD OF REDUCING A WAITING TIME WHEN CANCELLING A CONNECTION AND AN ELECTRONIC DEVICE THEREFOR

(71) Applicant: Samsung Electronics Co., Ltd., Gyeonggi-do (KR)

(72) Inventors: Chang-Soon Kim, Gyeonggi-do (KR); Bu-Seob Jung, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 290 days.

(21) Appl. No.: 13/862,750

(22) Filed: Apr. 15, 2013

(65) Prior Publication Data

US 2013/0273850 A1    Oct. 17, 2013

(30) Foreign Application Priority Data

Apr. 13, 2012    (KR) ................. 10-2012-0038297

(51) Int. Cl.
*H04W 76/06* (2009.01)
*H04W 8/00* (2009.01)
*H04W 84/18* (2009.01)
*H04W 84/20* (2009.01)

(52) U.S. Cl.
CPC ............ *H04W 76/066* (2013.01); *H04W 76/06* (2013.01); *H04W 8/005* (2013.01); *H04W 84/18* (2013.01); *H04W 84/20* (2013.01)

(58) Field of Classification Search
None
See application file for complete search history.

(56) References Cited

U.S. PATENT DOCUMENTS

| | | | |
|---|---|---|---|
| 2006/0276211 | A1 | 12/2006 | Gallo |
| 2011/0149806 | A1 | 6/2011 | Verma et al. |
| 2011/0281556 | A1* | 11/2011 | Choi et al. ................. 455/411 |
| 2012/0233266 | A1* | 9/2012 | Hassan et al. ............. 709/206 |

FOREIGN PATENT DOCUMENTS

EP    2312903 A1    4/2001

OTHER PUBLICATIONS

Wi-Fi Alliance; "Wi-Fi Peer-To-Peer (P2P) Specification v1.1;" Wi-Fi Alliance Specification; Jan. 1, 2010; pp. 1-159; XP009163866.

Niki, Satoshi, et al.; "Autonomous Decentralized Community Wireless Sensor Network System Architecture to Achieve High-Speed Connectivity Under Dynamical Situation;" International Symposium on Autonomous Decentralized Systems ISADS '09; Mar. 23, 2009; pp. 1-8; XP031514940.

Lu, Songwu, et al.; "A Transport Protocol for Supporting Multimedia Streaming in Mobile Ad Hoc Networks;" IEEE Journal on Selected Areas in Communications, vol. 21, No. 10; Dec. 1, 2003; pp. 1-12; XP011104244.

* cited by examiner

*Primary Examiner* — Alejandro Rivero
(74) *Attorney, Agent, or Firm* — Cha & Reiter, LLC.

(57) ABSTRACT

A method and apparatus attempt to connect Wi-Fi direct devices with each other and quickly recognize a cancellation of a connection when the connection is cancelled. The method includes performing a provision discovery process with a counterpart Wi-Fi electronic device, performing a group owner negotiation process with the counterpart Wi-Fi electronic device, and sending a cancellation notification to the counterpart Wi-Fi electronic device when connection with the counterpart Wi-Fi electronic device is ended.

10 Claims, 5 Drawing Sheets

METHOD OF REDUCING A WAITING TIME WHEN CANCELLING A CONNECTION AND AN ELECTRONIC DEVICE THEREFOR

CLAIM OF PRIORITY

This application claims, pursuant to 35 U.S.C. §119(a), priority to and the benefit of the earlier filing date of a Korean patent application filed in the Korean Intellectual Property Office on Apr. 13, 2012 and assigned Serial No. 10-2012-0038297, the entire disclosure of which is hereby incorporated by reference.

BACKGROUND OF THE INVENTION

1. Field of the Invention

The present invention relates to a Wi-Fi direct communication system. More particularly, the present invention relates to a method and apparatus for promptly recognizing cancellation of a connection when the connection is cancelled.

2. Description of the Related Art

Many electronic devices use Wi-Fi, a wireless technology for data exchange over a computer network, commercially available from the WI-FI ALLIANCE.

Wi-Fi direct technology or Wi-Fi Peer to Peer (P2P) technology is a technology for providing a direct connection between Wi-Fi devices using a Wi-Fi interface in the prior art without an Access Point (AP) which is a medium of a infrastructure network of the prior art.

Most Wi-Fi technologies in the prior art are for the purpose of performing an Internet connection through an AP and shows relatively weak support for direct communication between Wi-Fi devices. This relatively weak support is filled by Bluetooth technology. However, in consideration of a transmission distance and a transmission speed, it is anticipated that the Wi-Fi direct technology will fill parts which the Bluetooth technology does not cover.

There is also an ad-hoc mode, which is a mode for supporting direct connection, in the Wi-Fi technology of the prior art. However, the ad-hoc mode is not widely used due to a plurality of faults such as a problem of low security, a power consumption problem, and a problem in which a throughput is limited to 11 Mbps.

The Wi-Fi P2P technology in the prior art compensates for weakness of security by supporting a security mode of Wi-Fi Protected Access 2 (WPA2) and supports more simple connectivity between Wi-Fi devices using a Wi-Fi Simple Configuration (WSC).

Also, the Wi-Fi P2P technology improves a throughput significantly in comparison with the ad-hoc mode by supporting devices implementing the Institute of Electrical and Electronics Engineers (IEEE) 802.11n standards. An improved power consumption algorithm is added to the Wi-Fi P2P technology.

When a user does not want to connect Wi-Fi direct devices while he or she attempts to connect the Wi-Fi direct devices with each other, he or she may press a cancel push button or input a Personal Identification Number (PIN), and may cancel the attempt to connect the Wi-Fi direct devices.

However, when the user cancels a connection with a counterpart Wi-Fi direct device, the counterpart Wi-Fi direct device must wait for 120 seconds according to the Wi-Fi direct standard to recognize a cancelled status or history.

This waiting time results in an inconvenience to the user. When the user attempts to reconnect the Wi-Fi direct devices, there is a problem in that a time required to connect the Wi-Fi direct devices is increased.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for reducing a waiting time when cancelling a connection of Wi-Fi direct devices in a Wi-Fi direct communication system.

Another aspect of the present invention is to provide an apparatus and method for reducing time required to perform reconnection when a Wi-Fi direct device fails in its connection and reducing a waiting time by immediately ending a corresponding connection when the corresponding connection is cancelled according to an intention of a user.

In accordance with an aspect of the present invention, a method of notifying of a connection failure of a Wi-Fi electronic device is provided. The method includes performing a provision discovery process with a counterpart Wi-Fi electronic device, performing a group owner negotiation process with the counterpart Wi-Fi electronic device, and sending a cancellation notification to the counterpart Wi-Fi electronic device when a connection with the counterpart Wi-Fi electronic device is ended.

In accordance with another aspect of the present invention, a Wi-Fi electronic device is provided. The Wi-Fi electronic device includes at least one processor, a memory, and at least one software module which is stored in the memory and is configured to be executable by the at least one processor, wherein the software module includes an instruction for performing a provision discovery process with a counterpart Wi-Fi electronic device, performing a group owner negotiation process with the counterpart Wi-Fi electronic device, and sending a cancellation notification to the counterpart Wi-Fi electronic device when a connection with the counterpart Wi-Fi electronic device is ended.

In accordance with another aspect of the present invention, a Wi-Fi electronic device is provided. The Wi-Fi electronic device includes means for performing a provision discovery process with a counterpart Wi-Fi electronic device, means for performing a group owner negotiation process with the counterpart Wi-Fi electronic device, and means for sending a cancellation notification to the counterpart Wi-Fi electronic device when a connection with the counterpart Wi-Fi electronic device is ended.

In accordance with another aspect of the present invention, a computer readable medium which stores one or more programs including instructions for allowing a Wi-Fi electronic device to perform a provision discovery process with a counterpart Wi-Fi electronic device, perform a group owner negotiation process with the counterpart Wi-Fi electronic device, and send a cancellation notification to the counterpart Wi-Fi electronic device when a connection with the counterpart Wi-Fi electronic device is ended, such that the instructions will be executed by the Wi-Fi electronic device.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE INVENTION

Exemplary embodiments of the present invention will be described herein below with reference to the accompanying drawings. In the following description, well-known functions or constructions are not described in detail since they would obscure the invention in unnecessary detail. The present invention may, however, be embodied in many different forms and should not be construed as limited to the exemplary embodiments set forth herein. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

The same reference numbers are used throughout the drawings to refer to the same or like parts. Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among terms set forth herein, data refers to any kind of information processed by the device, including text and/or images received from any external entities, messages transmitted or received, and information created when a specific function is executed by the device.

The present invention relates to a method and apparatus for attempting to connect Wi-Fi direct devices with each other and quickly recognizing cancellation of a connection when the connection is cancelled.

Hereinafter, a description will be given for a method and apparatus for reducing a waiting time when cancelling of a connection of Wi-Fi direct devices in a Wi-Fi Direct communication system occurs.

Figure 1:
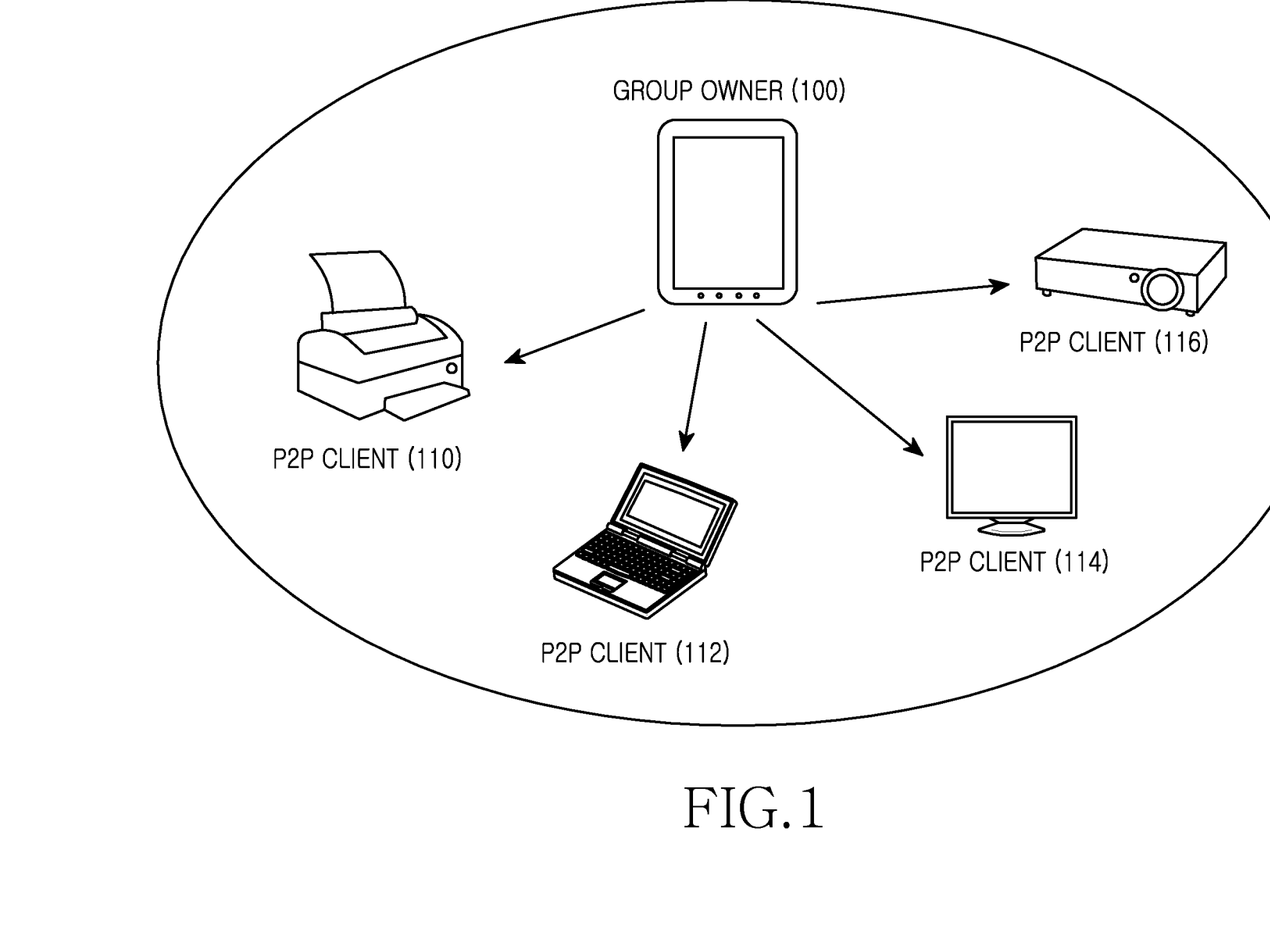
FIG. 1 illustrates a Wi-Fi direct communication system according to an exemplary embodiment of the present invention.

FIG. 1 illustrates a Wi-Fi direct communication system according to an exemplary embodiment of the present invention.

Referring to FIG. 1, a group formed by connecting Wi-Fi devices using Wi-Fi P2P technology is called a P2P Wi-Fi group. When Wi-Fi devices are connected by one to one connections, one Wi-Fi device, for example, the device 100, operates as a group owner and another Wi-Fi device operates as one or more of the P2P clients 110, 112, 114, and 116.

The group owner 100 performs a function in a manner similar to an AP of a wireless Local Area Network (LAN). Each of the P2P clients 110, 112, 114, and 116 plays a role of performing a function of a station of the wireless LAN. The role of each of these devices 110, 112, 114, 116 is determined through a P2P protocol known as group owner negotiations of a Wi-Fi P2P connection process.

A P2P Wi-Fi group using the Wi-Fi P2P technology is generated by a 1:N connection as well as a 1:1 connection. The number of acceptable P2P clients is determined according to the capability of the group owner 100 to manage such a number of acceptable P2P clients.

Hereinafter, a description will be given for a device discovery process in the Wi-Fi direct communication system.

The above-described P2P Wi-Fi group is determined after the device discovery process, capable of searching Wi-Fi devices, is performed. It is possible to search Wi-Fi devices through the device discovery process.

It is possible to connect the Wi-Fi devices searched through the device discovery process with each other. First of all, a first Wi-Fi P2P device performs a provision discovery process with a counterpart Wi-Fi P2P device which wants to connect to the first Wi-Fi P2P device. This provision discovery process is a process of informing information about when the first Wi-Fi P2P device discovers the counterpart Wi-Fi P2P device and attempts to connect with the counterpart Wi-Fi P2P device through WSC using a Push Button Configuration (PBC) or entering a personal identification number (PIN). The counterpart Wi-Fi P2P device sends a message for operating a WSC method of a specific type. The Wi-Fi P2P device which receives the message informs or sends the received message to a user through, for example, a pop-up window on a display screen, a text message, etc. Information, such as a title of the counterpart Wi-Fi P2P device which requests the provision discovery process, is included in the pop-up window. The user of the first Wi-Fi P2P device which receives the request determines whether to accept a connection with the counterpart Wi-Fi P2P device and to activate WSC using the information.

After this provision discovery process is performed, the Wi-Fi P2P devices determine their own roles through a group owner negotiation process. A Wi-Fi P2P device determined or set to be a group owner 100 operates as an AP and another Wi-Fi P2P device determined or set to be a P2P client 110, 112, 114, 116 operates as a Wi-Fi station.

When the group owner 100 and/or the P2P client 110, 112, 114, 116 is determined or set, the at least two Wi-Fi P2P devices exchange credentials, such as an authentication type, an encryption type, a network key, and a Service Set IDentifier (SSID), and complete their connection.

When the two Wi-Fi P2P devices 100, 110, 112, 114, 116 are connected with each other, the group owner drives a Dynamic Host Configuration Protocol (DHCP) server function and gets ready to assign an Internet Protocol (IP) address to the designated P2P client. The P2P client drives a DHCP client and receives an IP address from the group owner 100.

Figure 2:
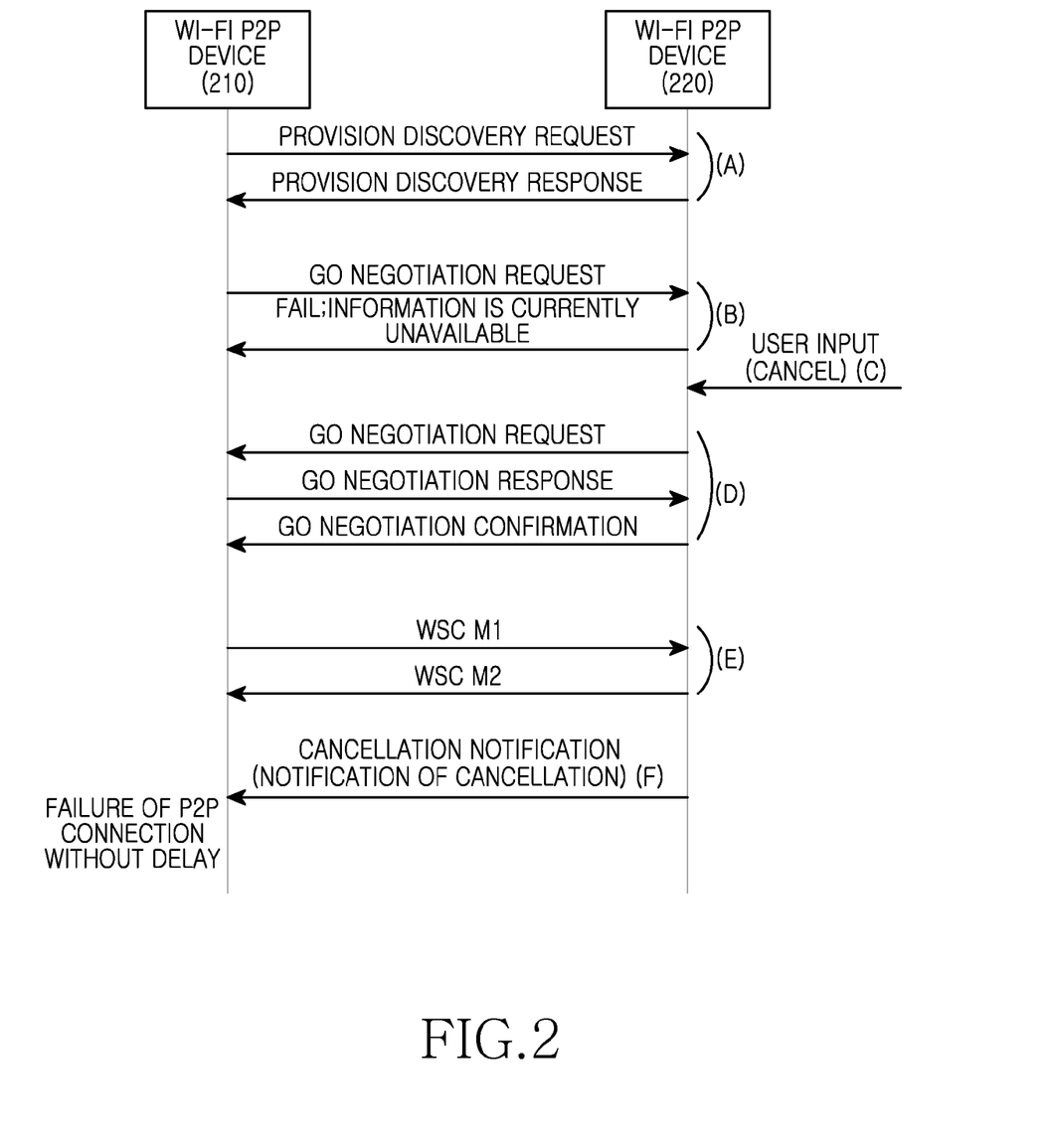
FIG. 2 is a signal sequence diagram illustrating a process of reducing a waiting time according to the exemplary embodiment of the present invention.

FIG. 2 is a signal sequence diagram illustrating a process of reducing a waiting time according to the exemplary embodiment of the present invention.

Referring to FIG. 2, in a provision discovery process in step A of a pair of Wi-Fi P2P devices 210 and 220, a provision discovery request is sent from the Wi-Fi P2P device 210 to the Wi-Fi P2P device 220, and the Wi-Fi P2P device 220 sends a provision discovery response to the Wi-Fi P2P device 210. While the Wi-Fi P2P device 220 waits for push button input or PIN input of a user using WSC, a Group Owner (GO) negotiation process is performed, in which the Wi-Fi P2P device 210 sends a GO negotiation request to the Wi-Fi P2P device 220 in step B. If there is no input of the user of the Wi-Fi P2P device 220, a fail message is automatically sent to the Wi-Fi P2P device 210 in step B, indicating that information is currently unavailable.

When the user of the Wi-Fi P2P device 220 cancels the input in step C by entering, for example, a cancel command, in general, the Wi-Fi P2P device 210, which is a counterpart Wi-Fi direct device, recognizes a connection failure because there is no an additional connection process after waiting for 120 seconds, for example, based on Wi-Fi direct standard.

However, in accordance with the exemplary embodiment of the present invention, when the user of the Wi-Fi P2P device 220 cancels a connection request without performing push button input or PIN input (e.g., when he or she clicks a cancel button) in step C, the Wi-Fi P2P device 220 sends a GO negotiation request message to the Wi-Fi P2P device 210, and ends a GO negotiation message exchange process normally in step D, for example, by receiving a GO negotiation response from the Wi-Fi P2P device 210, and by sending a GO negotiation confirmation message to the Wi-Fi P2P device 210 in step D.

The Wi-Fi P2P device 220 may fail in a WSC process intentionally in step E, and may cancel the connection process immediately. That is, the Wi-Fi P2P device 210, as the counterpart Wi-Fi direct device which attempts to connect with the Wi-Fi P2P device 220 for the first time, may recognize that the connection fails immediately by generating a failure of the WSC process intentionally, for example, by sending a first WSC message M1 to the Wi-Fi P2P device 220 from the Wi-Fi P2P device 210, and by receiving a second WSC message M2 at the Wi-Fi P2P device 210 from the Wi-Fi P2P device 220 in step E. Alternatively, the connection between Wi-Fi P2P devices 210, 220 may be canceled or ended accidentally.

The Wi-Fi P2P device 220 then sends a cancellation notification, as a message or notification of the cancellation, to the Wi-Fi P2P device 210 in step F to indicate a failure of the connection without delay.

If the Wi-Fi P2P device 220 fails in the WSC process intentionally, the Wi-Fi P2P device 210 does not disentangle or determine that the failure from whether the failure occurs because of intention of the user or whether the connection is rejected. Accordingly, if the Wi-Fi P2P device 220 sends a message indicating the error cause to the Wi-Fi P2P device 210, the Wi-Fi P2P device 210 may disentangle or determine the error cause clearly.

In accordance with the exemplary embodiment of the present invention, when the user cancels the connection process intentionally, the attempt to connect is immediately ended. Accordingly, there is no need for the counterpart device to perform an unnecessary operation for waiting for about 120 seconds, as is required in Wi-Fi communication systems in the prior art.

Figure 3:
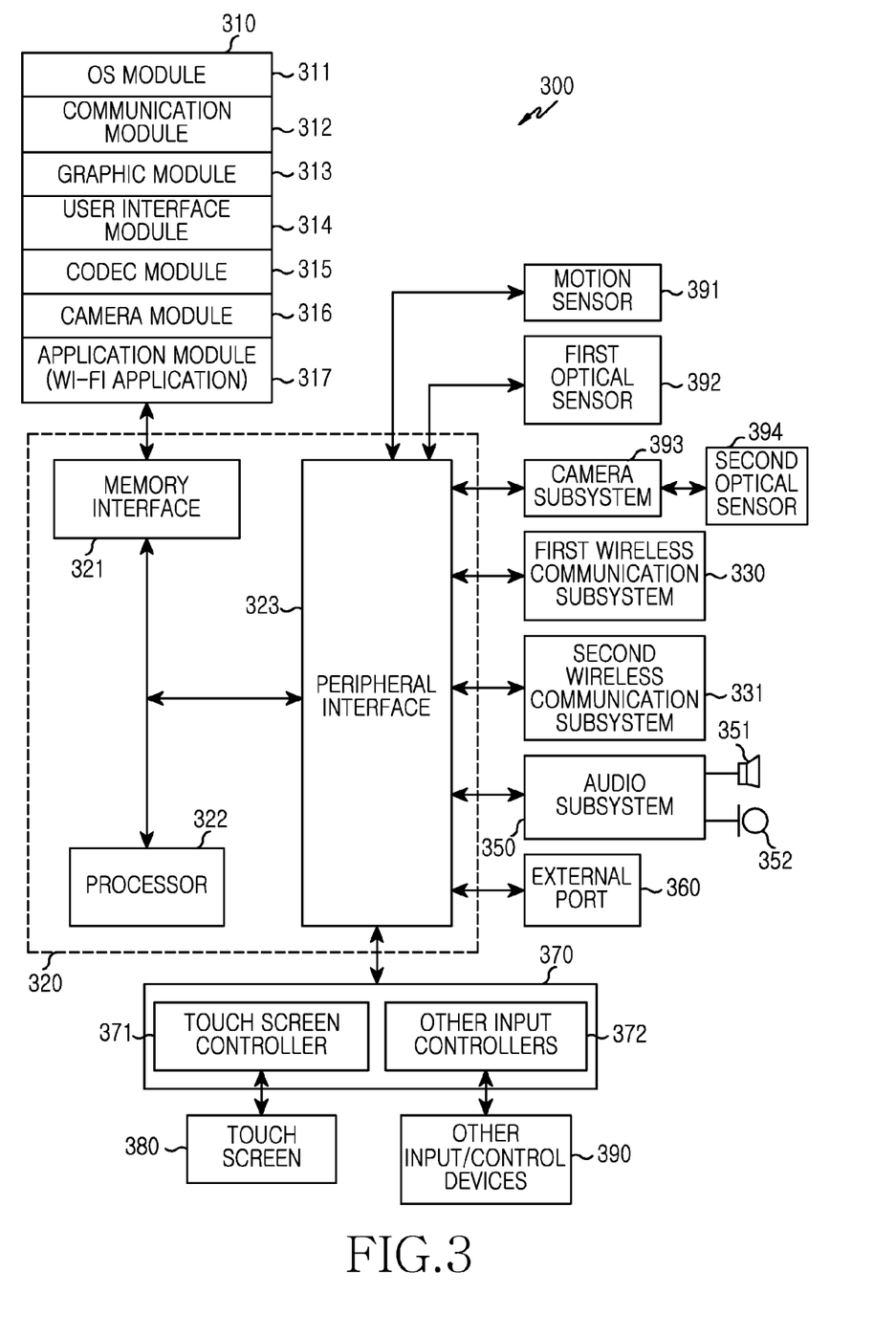
FIG. 3 is a block diagram illustrating configuration of a Wi-Fi direct device as the electronic device according to the exemplary embodiment of the present invention.

FIG. 3 is a block diagram illustrating configuration of a Wi-Fi direct device as an electronic device 300 according to the exemplary embodiment of the present invention.

Referring to FIG. 3, the electronic device 300 may be a portable electronic device. The electronic device 300 may be a portable terminal, a mobile phone, a mobile pad, a media player, a tablet computer, a handheld computer, or a Personal Digital Assistant (PDA). Also, the electronic device 300 may be any known type of portable electronic device including a device in which two or more functions are combined among these devices.

This electronic device 300 includes a memory 310, a processor unit 320, a first wireless communication subsystem 330, a second wireless communication subsystem 331, an external port 360, an audio subsystem 350, a speaker 351, a microphone 352, an Input/Output (I/O) system 370, a touch screen 380, other input/control devices 390, a motion sensor 391, a first optical sensor 392, a camera subsystem 393, and a second optical sensor 394. The memory 310 and the external port 360 may be a plurality of memories and external ports, respectively.

The processor unit 320 may include a memory interface 321, one or more processors 322, and a peripheral interface 323. In some cases, the whole processor unit 320 is referred to as a processor. The memory interface 321, the one or more processors 322, and/or the peripheral interface 323 may be separately configured, for example, as separate and distinct components, or may be integrated in one or more Integrated Circuits (ICs).

The processor 322 executes several software programs and performs several functions for the electronic device 300. Also, the processor 322 performs process and control for voice communication and data communication. Also, in addition to such typical communication functions and processes, the processor 322 executes a specific software module such as an instruction set or a command set stored in the memory 310 and plays a role in performing several specific functions corresponding to the specific software module. That is, the processor 322 interacts and operates with the software modules 311-317 stored in the memory 310 and performs the method according to the exemplary embodiment of the present invention.

The processor 322 may include one or more data processors, an image processor, or a codec. For example, the processor 322 may include the data processors, the image processor, or the codec as separate and/or distinct components and structures in the processor 322. Also, the processor 322 may include several processors for performing different functions.

The peripheral interface 323 connects the I/O system 370 of the electronic device 300 and several peripheral devices to the processor 322 and also to the memory 310, for example, though the memory interface 321.

A variety of components of the electronic device 300 may be coupled by one or more communication buses or stream lines or paths for data streaming, which are illustrated by the arrows and connections between components in FIG. 3.

The external port 360 is used to connect the electronic device 300 to another electronic device directly or connect the electronic device 300 to another electronic device indirectly through a network (e.g., the Internet, an intranet, a wireless Local Area Network (LAN), etc.). For example, the external port 360 may include, but is not limited to, any one of a Universal Serial Bus (USB) port, an IEEE 1394 compatible port, a FIREWIRE port as a port implementing a serial bus interface standard for high-speed communications and isochronous real-time data transfer, commercially available from APPLE CORPORATION, etc.

The motion sensor 391 and the first optical sensor 392 may connect to the peripheral interface 323 and may perform several functions. For example, the motion sensor 391 and the first optical sensor 392, when connected to the peripheral interface 323, may sense motion of the electronic device 300, and may sense light from outside of the electronic device 300. Furthermore, a position measurement system and other sensors such as a temperature sensor, a bio-sensor, etc., as other peripherals, may connect to the peripheral interface 323 and may perform related functions.

The camera subsystem 393 may connect with the second optical sensor 394 and may perform a camera function such as a photo and video clip recording function.

Each of the first optical sensor 392 and the second optical sensor 394 may be a Charge Coupled Device (CCD) or a Complementary Metal-Oxide Semiconductor (CMOS) device.

A communication function is performed through the first wireless communication subsystem 330 and the second wireless communication subsystem 331. Each of the first wireless communication subsystem 330 and the second wireless communication subsystem 331 may include a radio frequency receiver and/or transmitter and/or a beam or electromagnetic wave receiver and/or transmitter, for example, to receive and transmit infrared rays. The first communication subsystem 330 and the second communication subsystem 331 may be classified according to a communication network through which the electronic device 300 communicates.

For example, the communication network may be, but is not limited to, any one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network, or/and a Bluetooth network, etc. Each of the first communication subsystem 330 and the second communication subsystem 331 may include a communication subsystem designed to be operated through the communication network.

Herein, in accordance with the exemplary embodiment of the present invention, because it is necessary to perform Wi-Fi direct communication through a Wi-Fi direct network, one of the first wireless communication subsystem 330 and the second wireless communication subsystem 331 may be a Wi-Fi direct communication subsystem.

The first wireless communication subsystem 330 and the second wireless communication subsystem 331 may be combined and configured as one wireless communication subsystem.

The audio subsystem 350 may connect to the speaker 351 and the microphone 352 and may be responsible for inputting and outputting an audio stream, such as a voice recognition function, a voice copy function, a digital recording function, and a phone call function.

That is, the audio subsystem 350 communicates with a user through the speaker 351 and the microphone 352. The audio subsystem 350 receives a data stream through the peripheral interface 323 of the processor unit 320 and converts the received data stream into an electric stream. The converted electric stream is transmitted to the speaker 351. The speaker 351 converts the electric stream into a sound wave to which the user may listen and outputs the converted sound wave. The microphone 352 converts a sound wave transmitted from the user or other sound sources into an electric stream. The audio subsystem 350 receives the converted electric stream from the microphone 352. The audio subsystem 350 converts the received electric stream into an audio data stream and transmits the converted audio data stream to the peripheral interface 323. The audio subsystem 350 may include an attachable and/or detachable earphone, headphone, and/or headset.

The I/O system 370 may include a touch screen controller 371 and/or other input controllers 372. The touch screen controller 371 may be coupled to and/or in communication with the touch screen 380.

The touch screen 380 and the touch screen controller 371 may detect, but is not limited to, contact and motion or a stopping of such contact or motion using not only capacitive, resistive, infrared ray, and surface acoustic wave technologies for determining one or more contact points with the touch screen 380 but also any known multi-touch sensing technology including other known types of proximity sensor arrangements or other elements.

The other input controllers 372 may be coupled to the other input/control devices 390. The other input/control devices 390 may include one or more up/down buttons for volume control. Also, the one or more up/down buttons may be a push button or a rocker button. The other input/control devices 390 may also be pointer devices such as s rocket switch, a thumbwheel, a dial, a stick, and/or a stylus.

The touch screen 380 provides an input/output interface between the electronic device 300 and the user. That is, the touch screen 380 transmits as touch input of the user to the electronic device 300. Also, the touch screen 380 is a medium for displaying an output from the electronic device 300 to the user.

That is, the touch screen 380 displays a visual output to the user. This visual output may include a text type, a graphic type, a video type, and a combined type of such text, graphic, and video types.

The touch screen 380 may be any one of several types of known displays. For example, the touch screen 380 may be, but is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The memory 310 may be coupled to and/or in communication with the memory interface 321. The memory 310 may include a high-speed Random Access Memory (RAM) such as one or more magnetic storages, a non-volatile memory, one or more optical storages, and/or a flash memory (e.g., a NAND flash memory or a NOR flash memory).

The memory 310 stores software components and data. The software components include an Operating System (OS) module 311, a communication module 312, a graphic module 313, a user interface module 314, a CODEC module 315, a camera module 316, one or more application modules 317, etc. The application module 317 includes a Wi-Fi application for controlling a Wi-Fi direct communication system. That is, the application module 317 may perform the above-described process of FIG. 2 and may perform the operation for recognizing a connection cancellation of the user without waiting for 120 seconds. The modules, which are the software components, may be expressed in a set of instructions. Accordingly, the modules may be expressed in an instruction set. Also, the modules may be expressed in programs and applications. One or more modules, such as the modules 311-317, and/or including instructions for performing several methods according to the exemplary embodiments of the present invention, may be stored in the memory 310.

The OS module 311 (e.g., an embedded OS such as Windows, Linux, Darwin, RTXC, UNIX, OS X, or VxWorks) includes several software components for controlling a general system operation. For example, control of this general system operation means memory management and control, storage hardware and device control and management, power control and management, etc. This OS module 311 also performs a function for smoothly communicating between several hardware components and devices and software components and modules.

The communication module 312 may communicate with other electronic devices such as a computer, a server, and/or a portable terminal through the first wireless communication subsystem 330, the second wireless communication subsystem 331, and/or the external port 360.

The graphic module 313 includes several software components for providing and displaying graphics on the touch screen 380. The term "graphics" includes texts, web pages, icons, digital images, videos, animations, etc.

The user interface (UI) module 314 includes several software components related to a user interface. The user interface module 314 includes contents indicating whether a state of a user interface is changed to any state, whether a state of a user interface is changed in any condition, etc.

The CODEC module 315 may include software components related to the encoding and decoding of video files. The CODEC module 315 may include a video stream module such as an MPEG module and/or an H204 module. Also, the CODEC module 315 may include a code module for several known types of audio files such as AAA files, AMR files, and WMA files.

The camera module 316 includes camera1-related software components capable of performing camera-related processes and functions.

The application module 317 includes at least one of a browser function, an email function, an instant message function, a word processing function, a keyboard emulation function, an address book function, a touch list function, a widget function, a Digital Rights Management (DRM) function, a voice recognition function, a voice copy function, a position determining function, a location based service function, etc.

The memory 310 may include additional modules, applications, or instructions in addition to the above-described modules. Or, if necessary, the memory 310 does not use some modules, applications, or instructions.

A variety of functions of the electronic device 300, which are described above or to be described later, may be executed by one or more data streaming processes, hardware including an Application Specific Integrated Circuit (ASIC), software, and/or combination of such processes, hardware, and software.

Figure 4:
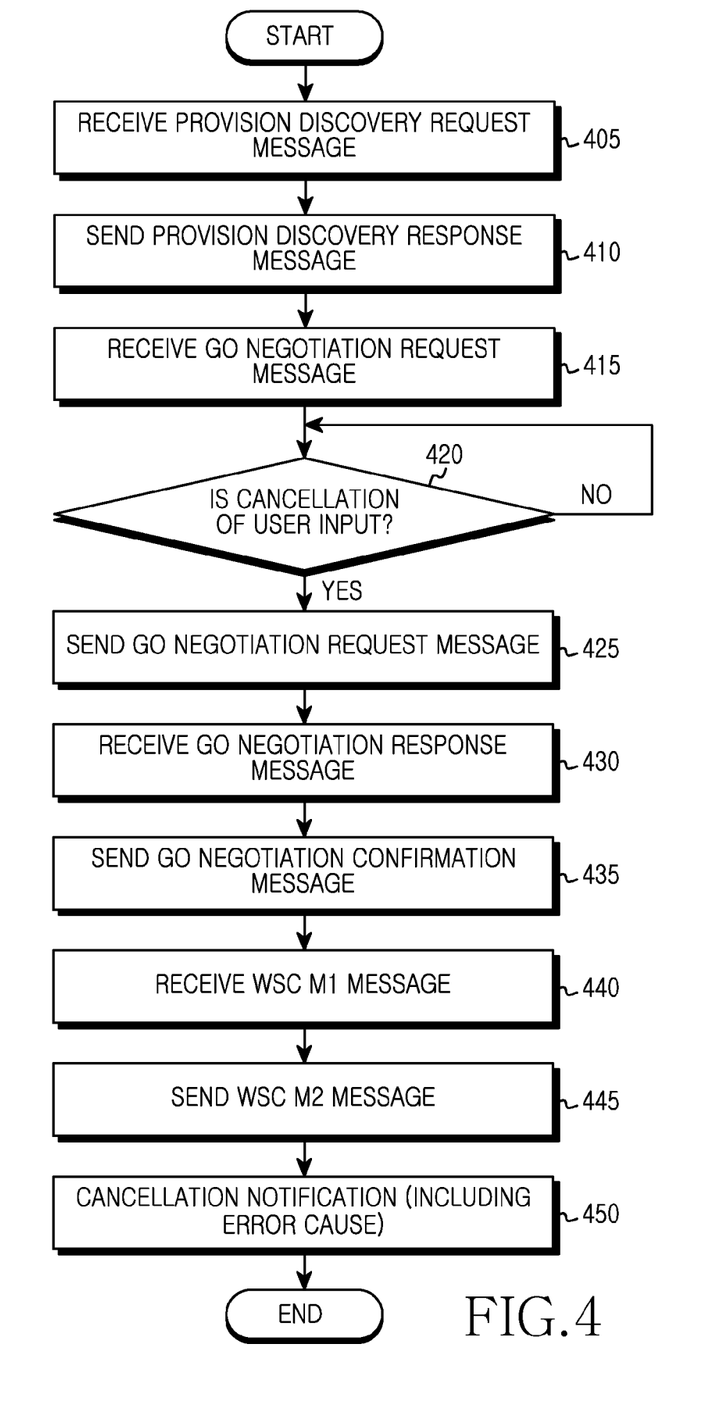
FIG. 4 is a flow chart illustrating an operation process of one Wi-Fi direct device according to the exemplary embodiment of the present invention.

FIG. 4 is a flow chart illustrating an operation process of one Wi-Fi direct device according to the exemplary embodiment of the present invention.

Referring to FIG. 4, FIG. 4 is a flow chart illustrating an operation process of the Wi-Fi P2P device 220 of FIG. 2.

An application of the Wi-Fi P2P device 220 receives a provision discovery request message in step 405. The Wi-Fi P2P device 220 sends a provision discovery response message as a response to a Wi-Fi P2P device 210 in step 410.

In this process, while the application of the Wi-Fi P2P device 220 waits for push button input or PIN input of a user in WSC, the Wi-Fi P2P device 220 receives a GO negotiation request message in step 415. If there is no input from the user, the application of the Wi-Fi P2P device 220 sends a fail message to the Wi-Fi P2P device 210 automatically.

When cancellation of the push button input or PIN input of the user is received in step 420, the application of the Wi-Fi P2P device 220 performs a GO negotiation process with an application of the Wi-Fi P2P device 210 and completes the processes in steps 425, 430, and 435. Otherwise, in step 420, if no cancellation of the push button input or PIN input of the user is received, the method loops back and repeats step 420 until cancellation of the push button input or PIN input of the user is received.

The method then performs step 425 to send a GO negotiation request message from the Wi-Fi P2P device 220 to the Wi-Fi P2P device 210, performs step 430 for the Wi-Fi P2P device 220 to receive the GO negotiation response message from the Wi-Fi P2P device 210, and performs step 435 for the Wi-Fi P2P device 220 to send a GO negotiation confirmation message to the Wi-Fi P2P device 210.

Thereafter, the application of the Wi-Fi P2P device 220 fails in a WSC process intentionally in steps 440 and 445, by which the Wi-Fi P2P device 220 receives a first WSC message M1 from the Wi-Fi P2P device 210 in step 440, and the Wi-Fi P2P device 220 sends a second WSC message M2 to the Wi-Fi P2P device 210 in step 445. The Wi-Fi P2P device 220 sends a cancellation notification including an error cause to the application of the Wi-Fi P2P device 210 in step 450 and informs the Wi-Fi P2P device 210 and/or the user of a cause of the cancelled Wi-Fi direct connection; that is, the P2P connection.

The method described above in relation with FIG. 4 under of the present invention may be provided as one or more instructions in one or more software modules, or computer programs stored in an electronic device including a portable terminal.

Figure 5:
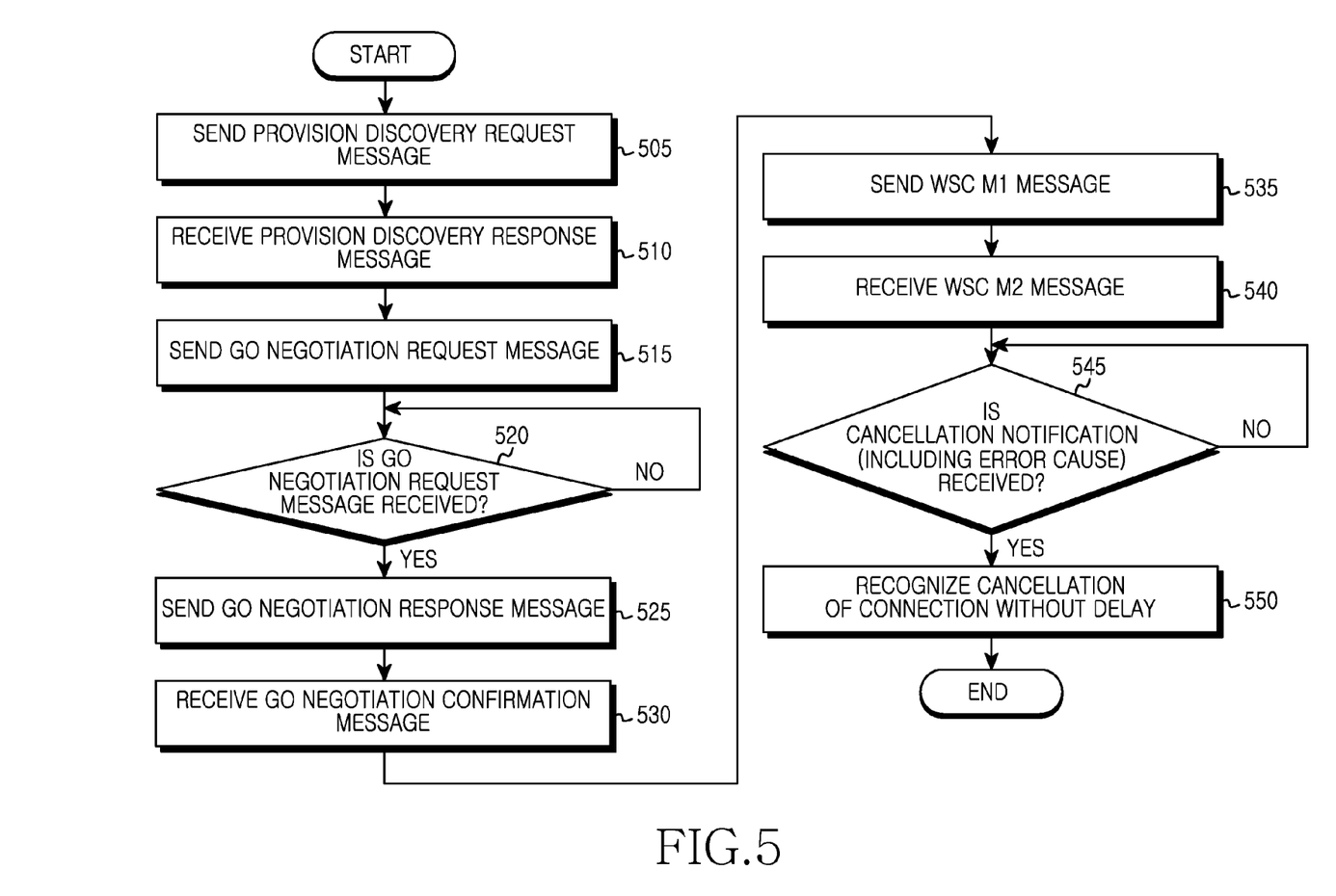
FIG. 5 is a flow chart illustrating an operation process of another Wi-Fi direct device according to the exemplary embodiment of the present invention.

FIG. 5 is a flow chart illustrating an operation of another Wi-Fi direct device according to the exemplary embodiment of the present invention.

Referring to FIG. 5, operation of the Wi-Fi P2P device 210 of FIG. 2 is described in greater detail.

When there is a connection request of a user, an application of the Wi-Fi P2P device 210 sends a provision discovery request message to the Wi-Fi P2P device 220 in step 505. The Wi-Fi P2P device 210 receives a provision discovery message as a response in step 510.

The application of the Wi-Fi P2P device 210 sends a GO negotiation request message to the Wi-Fi P2P device 220 in step 515. In this process, while an application of the Wi-Fi P2P device 210 waits for push button input or PIN input of a user in WSC, the Wi-Fi P2P device 210 receives the GO negotiation request message. If there is no the input of the user, the application of the Wi-Fi P2P device 220 sends a fail message to the Wi-Fi P2P device 210 automatically. The application of the Wi-Fi P2P device 210 then receives the fail message.

Thereafter, when cancellation of the push button input or PIN input of the user is received, the application of the Wi-Fi P2P device 220 sends the GO negotiation request message to the Wi-Fi P2P device 210. The application of the Wi-Fi P2P device detects for the GO negotiation request message in step 520, and loops back to step 520 until the GO negotiation request message is received. The application of the Wi-Fi P2P device 210 then completes a GO negotiation process with the Wi-Fi P2P device 220 in steps 525 and 530, in which the Wi-Fi P2P device 210 sends a GO negotiation response message to the Wi-Fi P2P device 220 in step 525, and the Wi-Fi P2P device 220 sends a GO negotiation confirmation message which is received by the Wi-Fi P2P device 210 in step 530.

Thereafter, the application of the Wi-Fi P2P device 220 fails in a WSC process intentionally in steps 535 and 540, in which the Wi-Fi P2P device 210 sends a first WSC message M1 to the Wi-Fi P2P device 220 in step 535, and the Wi-Fi P2P device 220 sends a second WSC message M2 which is received by the Wi-Fi P2P device 210 in step 540. The application of the Wi-Fi P2P device 210 then detects for a cancellation notification from the application of the Wi-Fi P2P device 220 in step 545, and loops back to step 545 until the cancellation notification is received in step 545. Once the cancellation notification is detected in step 545, the application of the Wi-Fi P2P device 210 may recognize that Wi-Fi direct connection is cancelled without a delay or a waiting time in step 550. A cause of the cancelled connection may be included in the cancellation notification. The cause of the cancelled connection may be sent independently.

The method described above in relation with FIG. 5 under of the present invention may be provided as one or more instructions in one or more software modules, or computer programs stored in an electronic device including a portable terminal.

The Wi-Fi direct communication system according to the exemplary embodiments of the present invention may reduce the time required for performing a reconnection when a Wi-Fi direct device fails in establishing or maintaining a connection, and may reduce a waiting time or delay time by ending the corresponding connection immediately when the connection is cancelled intentionally by a user.

The above-described apparatus and methods according to the present invention can be implemented in hardware, firmware or as software or computer code that can be stored in a non-transitory recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any media such as communication signals transmitted by wire/wireless connections, and their equivalents.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of notifying cancellation of a connection in an electronic device using Wi-Fi direct technology, Wi-Fi direct being a wireless technology for providing a direct connection between Wi-Fi devices using a Wi-Fi interface, the method comprising:
    performing a provision discovery process with a counterpart Wi-Fi electronic device;
    performing a group owner negotiation process with the counterpart Wi-Fi electronic device;
    when a connection request is cancelled, re-performing a group owner negotiation process with the counterpart Wi-Fi electronic device; and
    failing in a Wi-Fi simple configuration (WSC) process of the counterpart Wi-Fi electronic device intentionally.

2. The method of claim 1, wherein the cancellation notification includes a message indicating a cause of the end of the connection.

3. The method of claim 1, wherein further comprising:
    sending a cancellation notification to the counterpart Wi-Fi electronic device.

4. The method of claim 1, wherein the provision discovery process including receiving a message for operating the WSC process, the WSC process requiring a push button input or a personal identification number (PIN) input from a user of the electronic device to activate a connection with the counterpart Wi-Fi electronic device.

5. The method of claim 1, wherein the group owner negotiation process including receiving a group owner negotiation request from the counterpart Wi-Fi electronic device while waiting for push button or PIN input from a user.

6. An electronic device using Wi-Fi direct technology, Wi-Fi direct being a wireless technology for providing a direct connection between Wi-Fi devices using a Wi-Fi interface, the electronic device comprising:
    a processor;
    a wireless communication subsystem configured to perform Wi-Fi direct communication with a counterpart Wi-Fi electronic device; and
    a memory configured to store a software module and data;
    wherein the software module is configured to be executable by the processor, and
    wherein the software module includes Wi-Fi application configured for controlling the wireless communication subsystem to perform a provision discovery process with the counterpart Wi-Fi electronic device, to perform, a group owner negotiation process with the counterpart Wi-Fi electronic device, when a connection request is cancelled, to re-perform a group owner negotiation process with the counterpart Wi-Fi electronic device, and to fail in a Wi-Fi simple configuration (WSC) process of the counterpart Wi-Fi electronic device intentionally.

7. The Wi-Fi electronic device of claim 6, wherein the cancellation notification includes a message indicating a cause of the end of the connection.

8. The electronic device of claim 6, wherein the software module is further configured to send a cancellation notification to the counterpart Wi-Fi electronic device after failing in a WSC process of the counterpart Wi-Fi electronic device.

9. The electronic device of claim 6, wherein the provision discovery process including receiving a message for operating the WSC process, the WSC process requiring a push button input or a personal identification number (PIN) input from a user of the electronic device to activate a connection with the counterpart Wi-Fi electronic device.

10. The electronic device of claim 6, wherein the group owner negotiation process including receiving a group owner negotiation request from the counterpart Wi-Fi electronic device while waiting for push button or PIN input from a user.

* * * * *

UNITED STATES PATENT AND TRADEMARK OFFICE
CERTIFICATE OF CORRECTION

| | | |
|---|---|---|
| PATENT NO. | : 9,258,841 B2 | Page 1 of 1 |
| APPLICATION NO. | : 13/862750 | |
| DATED | : February 9, 2016 | |
| INVENTOR(S) | : Chang-Soon Kim et al. | |

It is certified that error appears in the above-identified patent and that said Letters Patent is hereby corrected as shown below:

In the Claims

Column 12, Claim 6, Lines 43-44 should read as follows:
--…to perform a group…--

Signed and Sealed this
Third Day of May, 2016

Michelle K. Lee
*Director of the United States Patent and Trademark Office*